(12) United States Patent
Aoyama et al.

(10) Patent No.: US 8,801,555 B2
(45) Date of Patent: Aug. 12, 2014

(54) METAL BELT FOR CONTINUOUSLY VARIABLE TRANSMISSION

(75) Inventors: Hideaki Aoyama, Wako (JP); Toru Yagasaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 383 days.

(21) Appl. No.: 12/203,591

(22) Filed: Sep. 3, 2008

(65) Prior Publication Data

US 2009/0111634 A1  Apr. 30, 2009

(30) Foreign Application Priority Data

Sep. 4, 2007  (JP) .................. 2007-229498

(51) Int. Cl.
*F16G 1/22* (2006.01)
*F16G 5/16* (2006.01)

(52) U.S. Cl.
USPC .......................................................... 474/242

(58) Field of Classification Search
USPC .............. 474/240, 242, 244, 245, 265, 272
See application file for complete search history.

(56) References Cited

U.S. PATENT DOCUMENTS

| 6,629,904 B2 * | 10/2003 | Fujioka et al. ............. 474/242 |
| 6,896,633 B2 * | 5/2005 | Kanehara .................... 474/242 |
| 2005/0003917 A1 * | 1/2005 | Kanehara et al. ............ 474/201 |

FOREIGN PATENT DOCUMENTS

| EP | 0 976 949 A1 | 2/2000 |
| JP | 63-14048 U | 1/1988 |
| JP | 06-010992 A | 1/1994 |
| JP | 6-6313 Y2 | 2/1994 |
| JP | 2003-056649 A | 2/2003 |
| JP | 2005-254335 A | 9/2005 |
| JP | 2005-272884 A | 10/2005 |
| JP | 2006-220273 A | 8/2006 |

* cited by examiner

*Primary Examiner* — Sang Kim
*Assistant Examiner* — Juan Campos, Jr.
(74) *Attorney, Agent, or Firm* — Arent Fox LLP

(57) ABSTRACT

Although a radial outside portion of a metal ring contact surface of a neck section of a metal element which is contactably opposed to a side edge of a metal ring of a metal ring assembly has high frequencies of contacting with a side edge of the metal ring, it is possible to suppress abrasion of the side edge of the metal ring and to improve durability of the metal ring by setting a surface hardness of the radial outside portion lower than a surface hardness of the metal ring. In addition, by setting a surface hardness of the metal ring contact surface at its portion of the radial outside lower than the surface hardness of the metal ring contact surface at other portions thereof where the frequencies of contacting with the side edge of the metal ring becomes low, in comparison with a case of setting the surface hardness of the whole metal ring contact surface low, it is possible to increase strength of the metal element and to improve the durability of the metal element.

3 Claims, 7 Drawing Sheets

PRESENT INVENTION

METAL BELT FOR CONTINUOUSLY VARIABLE TRANSMISSION

CROSS-REFERENCE TO RELATED APPLICATION

This application claims the priority of Japanese Application No. 2007-229498, filed Sep. 4, 2007, the entire specification, claims and drawings of which are incorporated herewith by reference.

BACKGROUND OF THE INVENTION

1. Field of the Invention

The present invention relates to a metal belt for a continuously variable transmission, comprising a metal ring assembly formed by stacking a plurality of endless metal rings one on another, and a number of metal elements supported on the metal ring assembly, the metal belt being wound around pulleys to transmit a driving force, and in particular, to the metal element which includes a ring slot which is surrounded in three sides by a main body section abutting on V faces of the pulley, a neck section extending to a radial outside from the main body section, and an ear section protruding from a radial outside edge of the neck section to a right and left, the ring slot housing the metal ring assembly therein.

2. Description of the Related Art

Japanese Utility-Model Publication No. 6-6313 has made it known that in a metal belt of a belt type continuously variable transmission, worn-out and fracture of a metal band of the metal belt by contact with a belt engagement section of a metal block is prevented while avoiding abrasion of the metal block by contact with V faces of a pulley, by setting a hardness of the belt engagement section of the metal block, against which a side edge of the metal band abuts, lower than that of the metal band, and by setting a hardness of portions of the metal block other than the above-mentioned belt engagement section higher than that of the V faces of the pulley.

In the meantime, as shown in FIG. 6, in a metal element 32 which includes a ring slot 35 which is surrounded in three sides by a main body section 34 abutting on a V face of a pulley, a neck section 36 extending to a radial outside from the main body section 34, and an ear section 37 protruding from a radial outside edge of the neck section 36 to a right and left, side edges 33a of all the metal rings 33 of a metal ring assembly 31 housed by the ring slot 35 do not contact a metal ring contact surface 36a of the neck section 36 equally. Metal rings 33 in radial inside and radial middle sections where behavior is stable since a lubricant is fully spread hardly contact the metal ring contact surfaces 36a of the neck sections 36, but metal rings 33 in a radial outside where behavior is unstable since a lubricant is not fully spread contact the metal ring contact surfaces 36a of the neck sections 36 frequently.

Nevertheless, the conventional one has a possibility that strength of the metal element may drop sharply and the neck section or the like may break since hardness of a whole region of the metal ring contact surface of the metal block is reduced.

SUMMARY OF THE INVENTION

The present invention was made in view of the above-described circumstances, and an object of the present invention is to improve durability of metal rings to abrasion while securing strength of metal elements of the metal rings of a belt type continuously variable transmission.

In order to achieve the object, according to a first feature of the present invention, there is provided a metal belt for a continuously variable transmission, comprising a metal ring assembly formed by stacking a plurality of endless metal rings one on another, and a number of metal elements supported on the metal ring assembly, the metal belt being wound around pulleys to transmit a driving force, wherein the metal element includes a ring slot which is surrounded in three sides by a main body section abutting on V faces of the pulley, a neck section extending to a radial outside from the main body section, and an ear section protruding from a radial outside edge of the neck section to a right and left, the ring slot housing the metal ring assembly therein; wherein a metal ring contact surface of the neck section which is contactably opposed to a side edge of the metal ring of the metal ring assembly has a surface hardness set so as to become lower from the main body section toward the radial outside.

With the above configuration, although a radial outside portion of the metal ring contact surface of the neck section of a metal element which is contactably opposed to the side edge of the metal ring of the metal ring assembly has a high frequency of contacting with the side edge of the metal ring, since the metal ring contact surface has the surface hardness set so as to become lower from the main body section of the metal element toward the radial outside, it is possible to suppress abrasion of the side edge of the metal ring and to improve durability of the metal ring, by setting up the surface hardness of a portion lower as a frequency of contacting with the side edge of the metal ring becomes higher.

According to a second feature of the present invention, in addition to the first feature, the surface hardness of the metal ring contact surface of the neck section at its portion on the radial outside is set lower than the surface hardness of the metal ring and lower than the surface hardness of the metal ring contact surface at other portions thereof.

With the above configuration, by setting the surface hardness of the metal ring contact surface at its portion on the radial outside, which has a high frequency of contacting with the side edge of the metal ring, lower than the surface hardness of the metal ring, it is possible to suppress abrasion of the side edge of the metal ring and to improve the durability of the metal ring. In addition, by setting the surface hardness of the metal ring contact surface at its portion on the dial outside, which has a high frequency of contacting with the side edge of the metal ring, lower than the surface hardness of the metal ring contact surface at other portions thereof, which have low frequencies of contacting with the side edge of the metal ring, in comparison with a case of setting the surface hardness of the whole metal ring contact surface low, it is possible to increase strength of the metal element and to improve the durability of the metal element. Therefore, it becomes possible to aim at compatibility of the durability of the metal ring and metal element.

According to a third feature of the present invention, in addition to the first feature, the metal ring has a nitrogen-rich layer in a region whose depth from a surface of the metal ring is 1 μm or less.

With the above configuration, since a nitrogen-rich layer is formed in a region whose depth from a surface of the metal ring is 1 μm or less, it is possible to obtain a good elongation characteristic of the metal ring with raising only the surface hardness of the metal ring and enhancing abrasion resistance.

According to a fourth feature of the present invention, in addition to any of the first to third features, the surface hardness of the metal ring contact surface of the neck section at its portion on the radial outside is set lower than the surface hardness of the metal ring contact surface at other portions thereof by being subjected to peening processing in a direction toward a radial inside portion of the metal ring contact surface of the neck section.

With the above configuration, it is possible to make the surface hardness of the metal ring contact surface of the neck section at its portion on the radial outside lower than the surface hardness at other portions thereof by simple processing of only being subjected to peening processing in a direction toward the radial inside portion of the metal ring contact surface of the neck section.

A drive pulley 5 and a driven pulley 7 of an embodiment correspond to the pulley of the present invention.

The above-described and other objects, features, and advantages in the present invention will become obvious from descriptions of a preferable embodiment described in full detail below along attached drawings.

BRIEF DESCRIPTION OF THE DRAWINGS

FIGS. 1 to 6 show an embodiment of the present invention.

FIG. 1 is a skeleton diagram of a power transmitting system of a vehicle on which a belt type continuously variable transmission is mounted.

FIG. 2 is a partial perspective view of a metal belt.

FIG. 4 is a graph showing a hardness of a metal ring contact surface of a neck section of the metal element, and a hardness of a metal ring.

FIG. 5 is a graph showing distribution of the nitrogen concentration of a metal ring in a depth direction.

FIG. 6 is a diagram showing behavior of the metal ring within a ring slot.

DESCRIPTION OF THE PREFERRED EMBODIMENT

An embodiment of the present invention will be described below on the basis of FIGS. 1 to 6.

Figure 2:
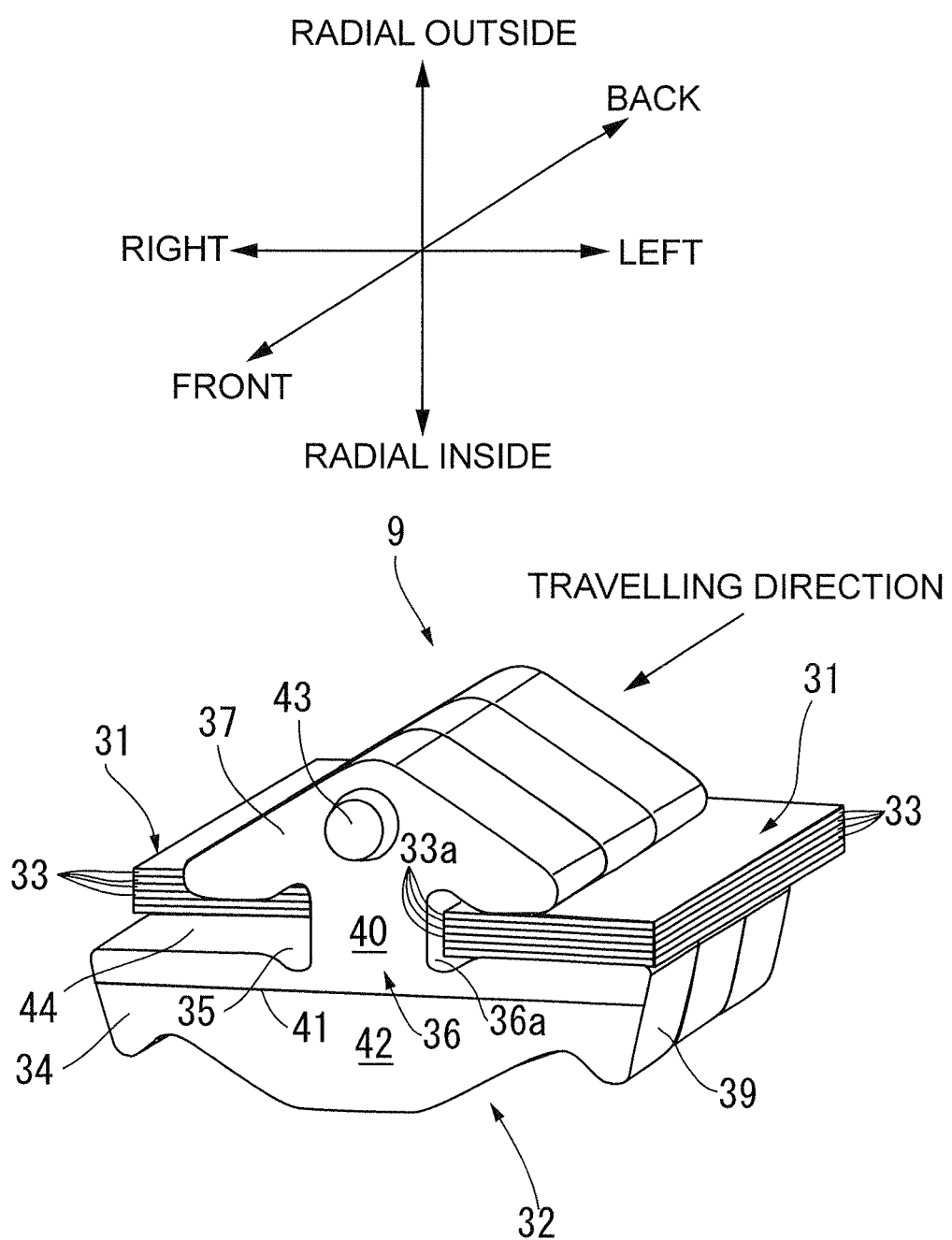

Definitions of front and back directions, right and left directions, and a radial direction of a metal element or metal ring used in this embodiment are shown in FIG. 2. The radial direction is defined as a radial direction of a pulley on which the metal element abuts, a side near a shaft of the pulley is a radial inside, and a side far from the shaft of the pulley is a radial outside. In addition, the right and left directions are defined as directions along a shaft of the pulley on which the metal element abuts, and the front and back directions are defined as directions along a travelling direction of the metal element at the time of an advancing travel of a vehicle.

Figure 1:
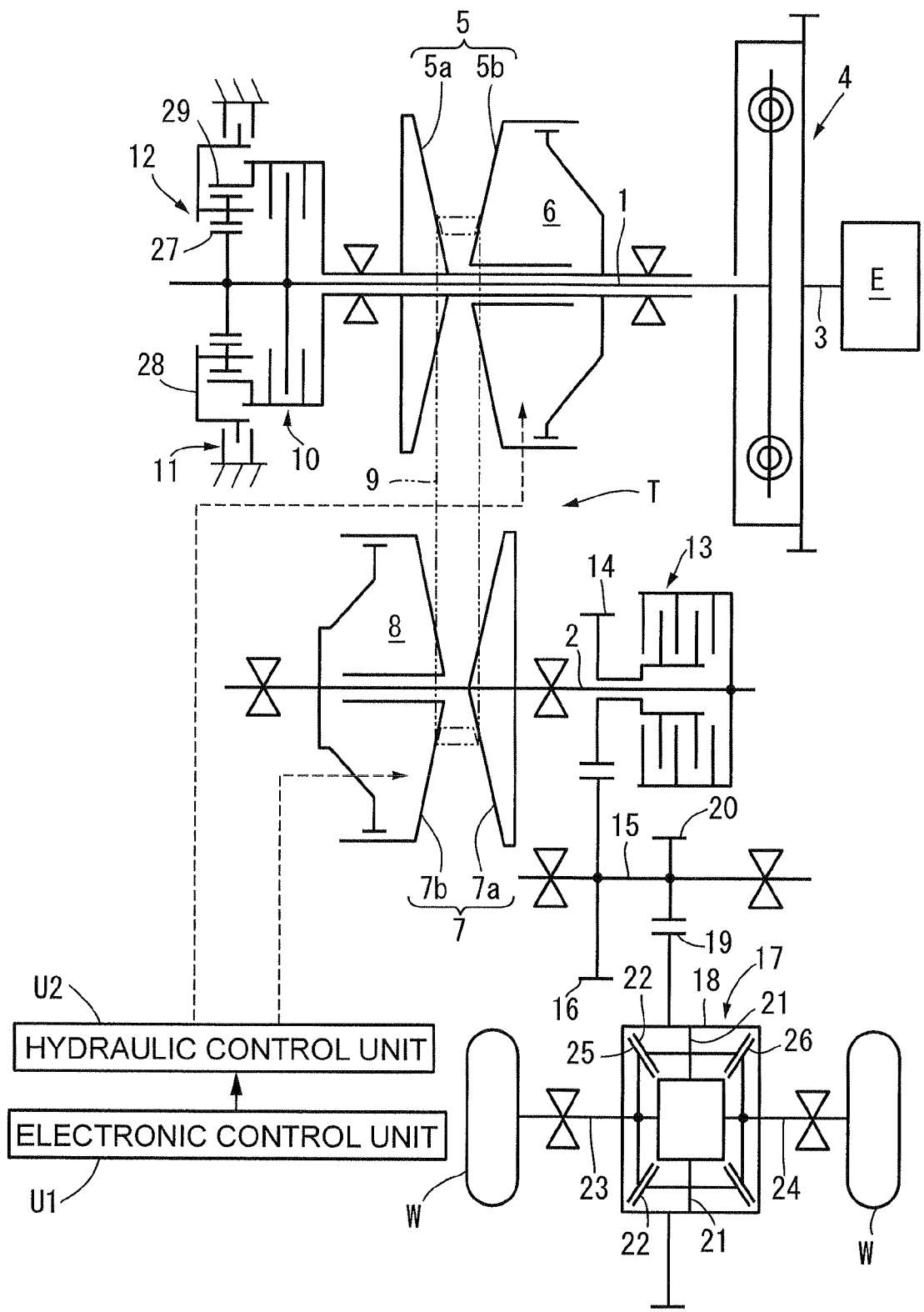

As shown in FIG. 1, a belt type continuously variable transmission T for a vehicle includes a drive shaft 1 and a driven shaft 2 which are arranged in parallel, and a left end of a crankshaft 3 of an engine E is connected to a right end of the drive shaft 1 through a damper 4.

The drive pulley 5 supported by the drive shaft 1 includes a fixed-side pulley half body 5a which is relatively rotatable freely to the drive shaft 1, and a movable-side pulley half body 5b which is axially slidable to this fixed-side pulley half body 5a. The movable-side pulley half body 5b has a groove width, which is changed by hydraulic pressure which acts on a hydraulic fluid chamber 6, between with the fixed-side pulley half body 5a. The driven pulley 7 supported by the driven shaft 2 includes a fixed-side pulley half body 7a which is formed integrally with the driven shaft 2, and a movable-side pulley half body 7b which is axially slidable to this fixed-side pulley half body 7a. The movable-side pulley half body 7b has a groove width, which is changed by hydraulic pressure which acts on a hydraulic fluid chamber 8, between with the fixed-side pulley half bodies 7a. Then, between the drive pulley 5 and driven pulley 7, a metal belt 9 equipped with a number of metal elements in two metal ring assemblies is wound.

In a left end of the drive shaft 1, a forward/reverse selection mechanism 12 which is constructed of a single pinion type planetary gear mechanism including a forward clutch 10 which engages when establishing a forward gear ratio, and transmits rotation of the drive shaft 1 in the same direction to the drive pulley 5, and a reverse brake 11 which engages when establishing a reverse gear ratio, and transmits the rotation of the drive shaft 1 to the drive pulley 5 in a reverse direction is provided. A sun gear 27 of the forward/reverse selection mechanism 12 is fixed to the drive shaft 1, a planetary carrier 28 can be restrained in a casing by the reverse brake 11, and a ring gear 29 can be coupled to the drive pulley 5 with the forward clutch 10.

A starting clutch 13 provided in a right end of the driven shaft 2 couples a first intermediate gear 14 supporting the driven shaft 2 freely relatively rotatably with the driven shaft 2. A second intermediate gear 16 which engages with the first intermediate gear 14 is provided in an intermediate shaft 15 arranged in parallel to the driven shaft 2. A third intermediate gear 20 provided in the intermediate shaft 15 engages with an input gear 19 provided in a gear pox 18 of a differential gear 17. Side gears 25 and 26 provided in tip ends of a left wheel axle 23 and a right wheel axle 24 which are supported freely relatively rotatably by the gear box 18 engage with a pair of pinions 22 and 22 supported through pinion shafts 21 and 21 by the gear box 18. Drive wheels W and W are connected in tip ends of the left wheel axle 23 and right wheel axle 24, respectively.

Then, when a forward range is selected with a select lever, the forward clutch 10 engages first by a command from a hydraulic control unit U2 which operate by an electronic control unit U1, and in consequence, the drive shaft 1 is integrally coupled with the drive pulley 5. Then, the starting clutch 13 engages, a torque of the engine E is transmitted to the drive wheels W and W through the drive shaft 1, drive pulley 5, metal belt 9, driven pulley 7, driven shaft 2, and differential gear 17, and the vehicle starts forward. When a reverse range is selected with a select lever, since the reverse brake 11 engages and the drive pulley 5 is driven in a direction reverse to a rotary direction of the drive shaft 1 by a command from the hydraulic control unit U2, the vehicle starts reversely by engagement of the starting clutch 13.

When the vehicle starts in this way, hydraulic pressure supplied to the hydraulic fluid chamber 6 of the drive pulley 5 increases by a command from the hydraulic control unit U2, and the movable-side pulley half body 5b of the drive pulley 5 approaches the fixed-side pulley half body 5a for an effective radius to increase. Simultaneously, hydraulic pressure supplied to the hydraulic fluid chamber 8 of the driven pulley 7 reduces, and the movable-side pulley half body 7b of the driven pulley 7 moves away from the fixed-side pulley half body 7a to reduce the effective radius. Hence, the belt type continuously variable transmission T has its ratio changed continuously from a LOW ratio (maximum ratio) toward an OD ratio (minimum ratio).

As shown in FIG. 2, the metal belt 9 is constructed by supporting a number of metal elements 32 with a pair of right and left metal ring assemblies 31 and 31, and each metal ring assembly 31 is constructed by stacking a plurality of sheets (12 sheets in the embodiment) of metal rings 33 one on another.

The metal element 32 formed by stamping from a metal plate material includes a main body section 34, a neck section 36 located between the pair of right and left ring slots 35 and 35 with which the metal ring assemblies 31 and 31 engage, and a substantially triangular ear section 37 connected to an radial outside of the main body section 34 through the neck section 36. A pair of pulley abutting surfaces 39 and 39 which is abuttable with V faces of the drive pulley 5 and the driven pulley 7 is formed in both the right and left end sections of the main body section 34. In addition, principal surfaces 40 abutting with each other are formed in front and rear sides of the metal element 32 in a travelling direction respectively. In addition, in a lower portion of the principal surface 40 in the front side in the travelling direction, an inclined surface 42 is formed through a locking edge 41 extending in right and left directions. Furthermore, mutually engageable concave-convex sections 43 are formed in front and rear surfaces of the ear section 37 so as to couple metal elements 32 and 32 which are adjacent forward and backward. Then, saddle surfaces 44 and 44 which support inner peripheral surfaces of the metal ring assemblies 31 and 31 are formed in lower edges of the right and left ring slots 35 and 35.

This embodiment changes a surface hardness of the metal ring contact surfaces 36a and 36a of the neck section 36 in a radial direction on the basis of knowledge that a contact frequency of the side edge 33a of the metal ring 33 to both sides of the right and left metal ring contact surfaces 36a and 36a of the neck section 36 of the metal element 32 becomes lower for metal rings 33 in a further radial inside, and the contact frequency becomes higher for metal rings 33 in a further radial outside.

Figure 3A:
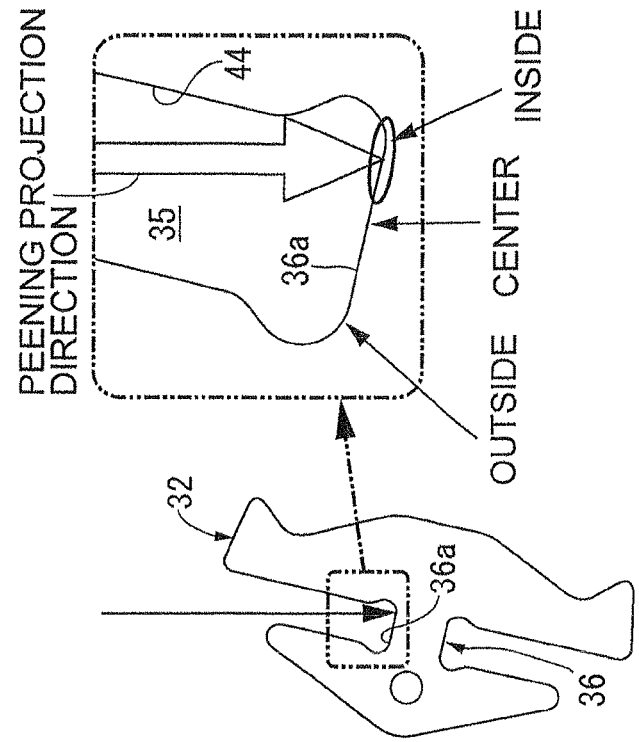
FIG. 3A is a diagram showing a projection direction of shot peening to a metal element of the present invention.

The surface hardness of the metal ring contact surface 36a of the neck section 36 is increased by shot peening. As shown in FIG. 3A, in this embodiment, a direction of a projection material for shot peening being projected is set to direct a radial inside portion of the metal ring contact surface 36a of the neck section 36. In consequence, a collision frequency of the projection material increases from the radial inside portion of the metal ring contact surface 36a of the neck section 36 to a radial intermediate portion to make the surface hardness high enough, and the collision frequency of the projection material decreases in a radial outside portion of the metal ring contact surface 36a of the neck section 36 to make the surface hardness not so high. As apparent from FIG. 4, the surface hardness of the metal ring contact surface 36a of the neck section 36 becomes high in comparison with a case of not being subjected to the shot peening (refer to two-dot chain line). And further, the hardness of the radial inside portion (refer to an alternate long and short dash line) and radial intermediate portion (refer to a dotted line) of the metal ring contact surface 36a which has high frequencies of colliding with the projection material is higher than that of the radial outside portion (refer to a thick continuous line) of the metal ring contact surface 36a which has a low frequency of colliding with the projection material.

On the other hand, the surface hardness (refer to a thin continuous line) of the metal ring 33 is increased by nitriding treatment to be higher than the surface hardness of any region of the metal ring contact surface 36a of the neck section 36. As apparent from FIG. 5, a nitrogen concentration of a region in a depth of 1 μm or less from a surface of the metal ring 33 is locally increased, and thereby, the surface hardness of the metal ring 33 is increased locally.

Figure 3B:
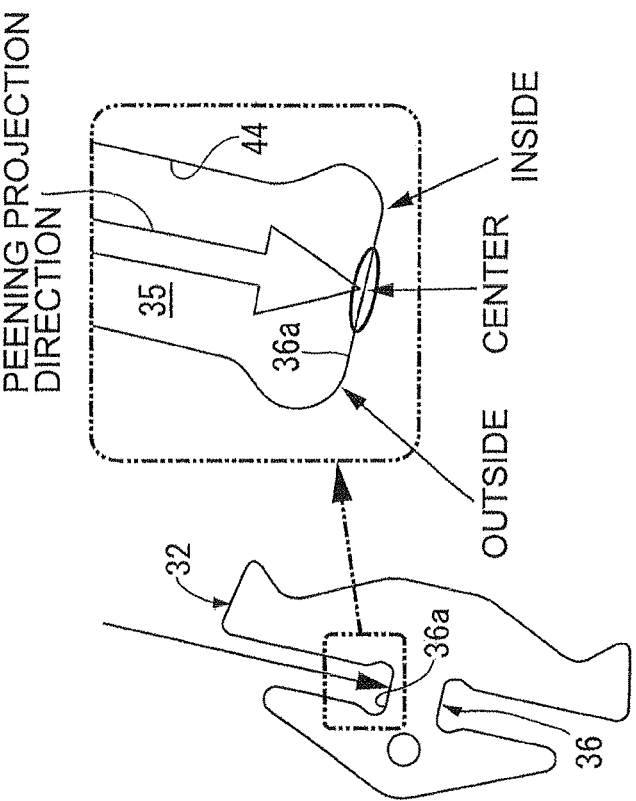
FIG. 3B is a diagram showing a projection direction of shot peening to a metal element of conventional example.
Figure 4:
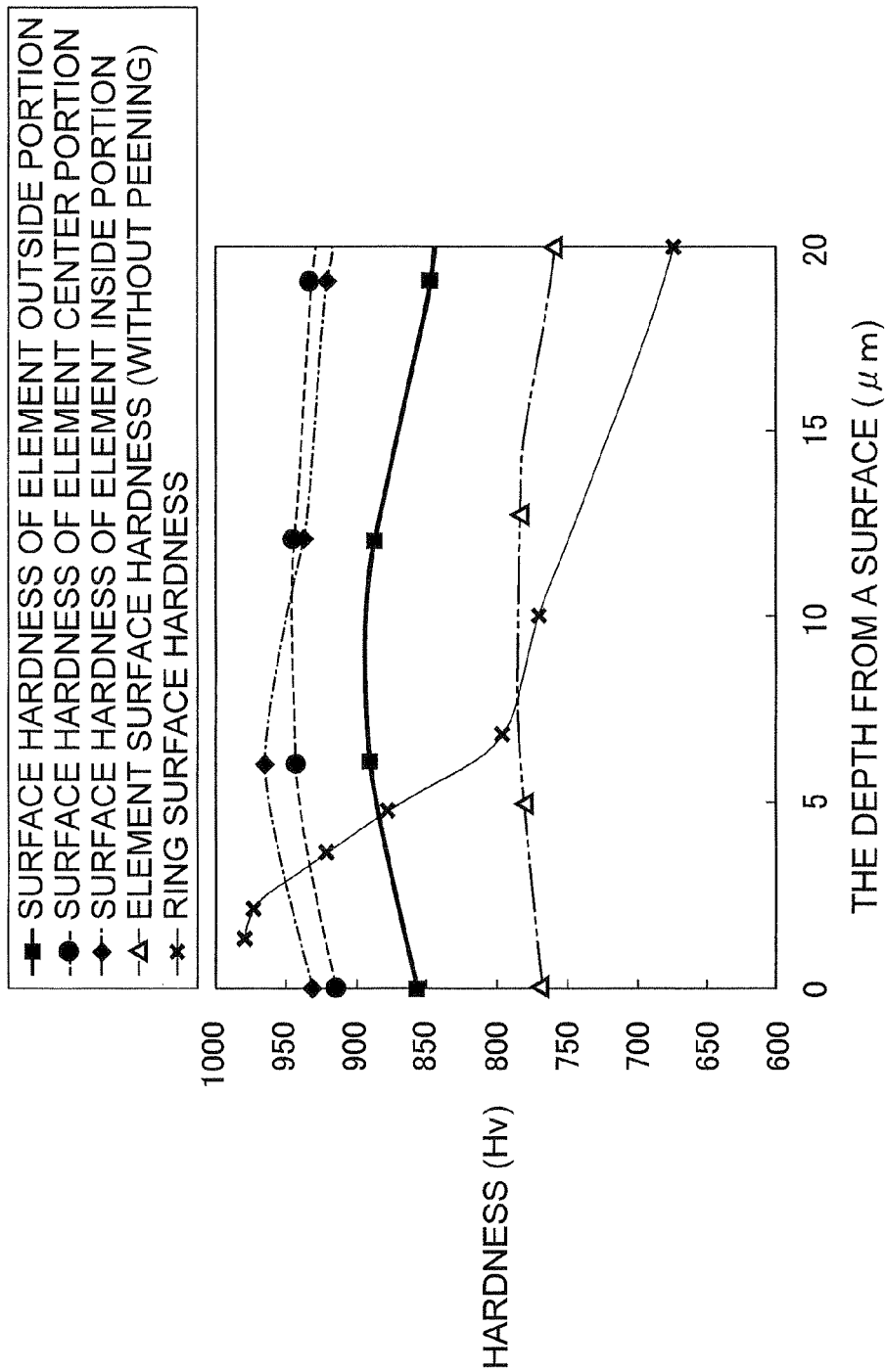
Figure 5:
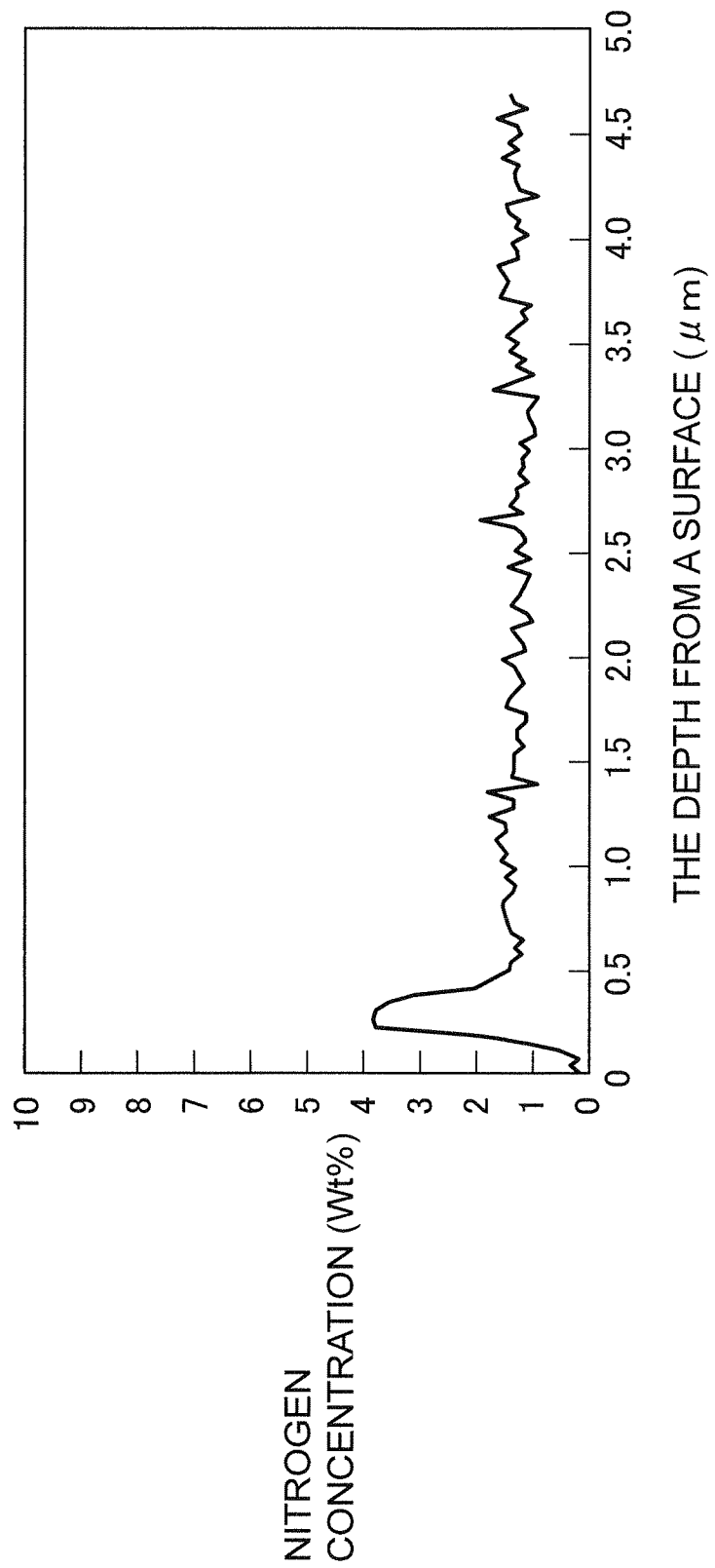
Figure 6:
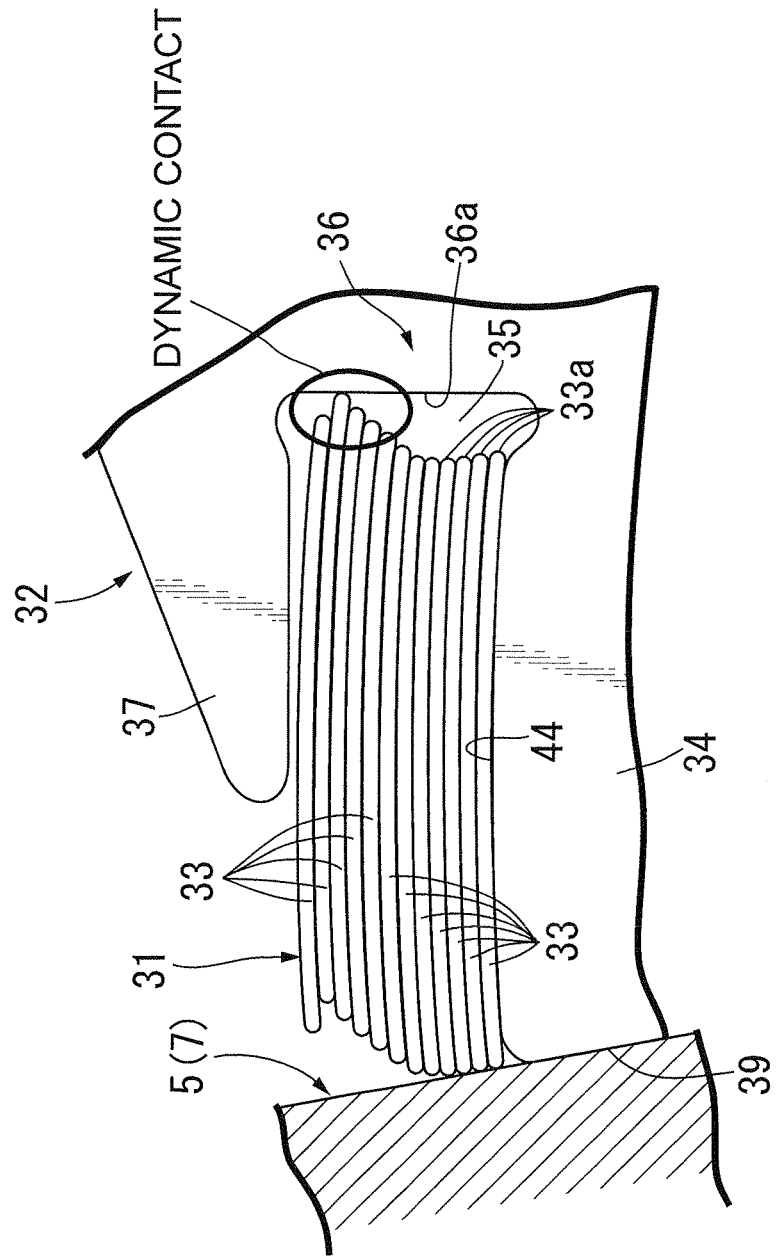
Figure 7:
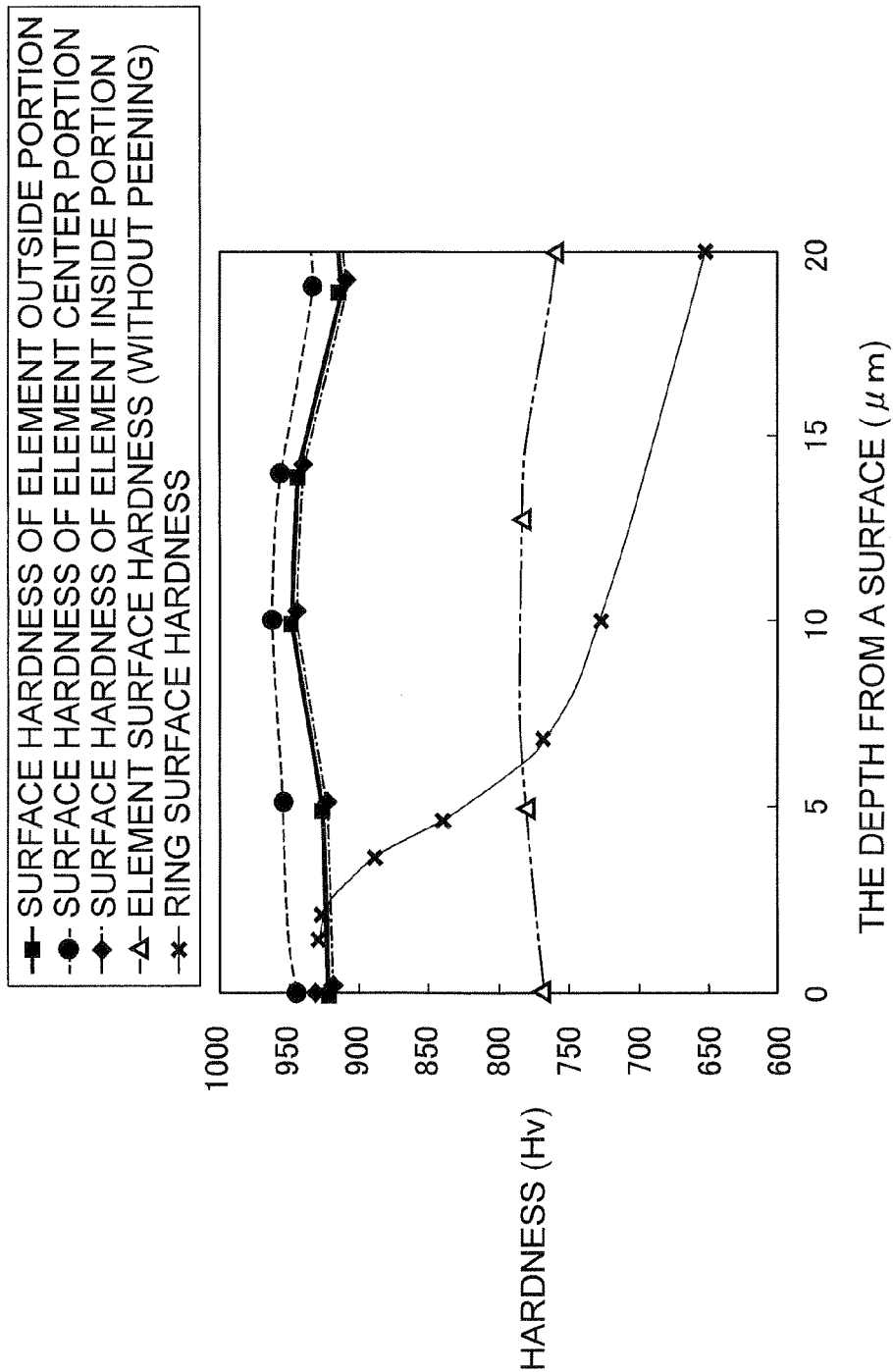
FIG. 7 is a diagram corresponding to FIG. 4, but showing a conventional example.

FIG. 3B shows a conventional example, and a direction of the projection material for shot peening being projected directs a radial center portion of the metal ring contact surface 36a of the neck section 36. For this reason, as shown in FIG. 7, the surface hardness of the radial intermediate portion (refer to a dotted line) of the metal ring contact surface 36a of the neck section 36 becomes highest, and the surface hardness of the radial outside portion (refer to a thick continuous line) and inner portion (refer to an alternate long and short dash line) of the metal ring contact surface 36a of the neck section 36 becomes lower than that.

As described above, the surface hardness of the metal ring 33 is made higher than the surface hardness of the radial outside portion of the metal ring contact surface 36a of the neck section 36 by making locally low the surface hardness of the dial outside portion in the metal ring contact surface 36a of the neck section 36 of the metal element 32, which has a high frequency of contacting with the side edge 33a of the metal ring 33 of the metal ring assembly 31. Hence, it is possible to suppress abrasion of the side edge 33a of the metal ring 33 and to improve the durability. Furthermore, since the surface hardness of the radial inside portion and radial center portion which have low frequencies of contacting with the side edge 33a of the metal ring 33 is kept higher than the surface hardness of the radial outside portion, it is possible to secure the strength of the metal element 32 at the maximum. In addition, since only the surface hardness of the metal ring 33 is increased and an internal hardness is kept low by locally increasing the nitrogen concentration of the region in a depth of 1 μm or less from a surface of the metal ring 33, it is possible to obtain the good elongation characteristic of the metal ring 33 with enhancing abrasion resistance of the surface.

TABLE 1

| | RING SIDE EDGE ABRASION LOSS (mm) | | |
|---|---|---|---|
| | AVE | MAX | MIN |
| CONVENTIONAL EXAMPLE | 0.010 | 0.011 | 0.009 |
| PRESENT INVENTION | 0.003 | 0.004 | 0.002 |

Table 1 compares the abrasion loss of the side edge of the metal ring in regard to the conventional example (refer to FIG. 3B) that a direction of the projection material for shot peening being projected directs a radial center portion of the metal ring contact surface 36a of the neck section 36, and the embodiment (refer to FIG. 3A) that a direction of the projection material for shot peening being projected directs a radial inside portion of the metal ring contact surface 36a of the neck section 36. It turns out that the abrasion loss of the embodiment decreases in comparison with the conventional example.

As described above, although the embodiment of the present invention is described, the present invention is not limited to the above-mentioned embodiment, but various design changes are possible without deviating from the present invention described in the scope of claims.

For example, in the embodiment, although the surface hardness of the metal ring 33 is set higher than those of all the portions of the metal ring contact surface 36a of the neck section 36 of the metal element 32 (refer to FIG. 4), what is necessary is just to set the surface hardness of the metal ring 33 at least higher than that of the radial outside portion of the metal ring contact surface 36a of the neck section 36.

What is claimed is:

1. A metal belt for a continuously variable transmission, comprising a metal ring assembly formed by stacking a plurality of endless metal rings one on another, and a number of metal elements supported on the metal ring assembly, the metal belt being wound around pulleys to transmit a driving force, wherein the metal element includes a ring slot which is surrounded on three sides by:
   a main body section abutting on V faces of the pulley,
   a neck section extending to a radial outside from the main body section, and
   an ear section protruding from a radial outside edge of the neck section to a right and left, the ring slot housing the metal ring assembly therein;
   wherein a metal ring contact surface of the neck section which is contactably opposed to a side edge of the metal ring of the metal ring assembly has a surface hardness which is lower at a radial outside portion with respect to the neck section than at other portions with respect to the neck section where a contact frequency of the side edge of the metal ring with respect to the radial outside portion of the metal ring contact surface is higher than that with respect to the other portions, the surface hardness of the metal ring contact surface of the neck section gradually decreasing in a direction extending from the main body section toward the radial outside portion with respect to the neck section,
   wherein a surface hardness of a radial center portion of the metal ring contact surface of the neck section is less than a surface hardness of a radial inside portion of the metal ring contact surface of the neck section, and the surface hardness of the radial outside portion of the metal ring contact surface of the neck section is less than the surface hardness of the radial center portion of the metal ring contact surface of the neck section,
   wherein the surface hardness of the metal ring contact surface of the neck section at the radial outside portion is less than a surface hardness of the metal ring,
   wherein the radial inside portion of the metal ring contact surface of the neck section is located near the main body section, and
   wherein the radial center portion of the metal ring contact surface of the neck section is located between the radial outside portion and the radial inside portion and is located at the vertical center of the plurality of endless metal rings.

2. The metal belt for a continuously variable transmission according to claim 1, wherein the metal ring has a nitrogen-rich layer in a region whose depth from a surface of the metal ring is 1 µM or less.

3. The metal belt for a continuously variable transmission according to any one of claims 1 and 2, wherein the surface hardness of the metal ring contact surface of the neck section at the radial outside portion is set to be less than the surface hardness of the metal ring contact surface of the neck section at the radial center and inside portions by being subjected to peening processing in a direction toward the radial inside portion of the metal ring contact surface of the neck section.

* * * * *